United States Patent [19]
Dempsey et al.

[11] 3,920,874
[45] Nov. 18, 1975

[54] SOFTENED FIBRILLATED SHEET

[75] Inventors: James J. Dempsey, Richmond, Va.; Drexel Kermit Smith, Kinston, N.C.

[73] Assignee: E. I. Du Pont de Nemours & Co., Wilmington, Del.

[22] Filed: Feb. 21, 1975

[21] Appl. No.: 551,962

Related U.S. Application Data

[60] Continuation of Ser. No. 442,405, Feb. 14, 1974, abandoned, which is a division of Ser. No. 98,676, Dec. 16, 1970, Pat. No. 3,811,979.

[52] U.S. Cl. ............... 428/198; 428/157; 428/162; 428/172; 428/288; 428/296
[51] Int. Cl.² .......................................... D04H 3/00
[58] Field of Search ........... 156/166, 183, 209, 271, 156/290; 264/146, 157, 291, 284; 428/162, 172, 178, 198, 288, 296, 197, 156, 157

[56] References Cited
UNITED STATES PATENTS

| | | | |
|---|---|---|---|
| 3,081,519 | 3/1963 | Blades et al. ........................... | 28/81 |
| 3,169,899 | 2/1965 | Steuben .............................. | 428/198 |
| 3,478,141 | 11/1969 | Dempsey et al. ..................... | 264/284 |
| 3,485,711 | 12/1969 | Fish, Jr. et al. ...................... | 428/310 |
| 3,619,339 | 11/1971 | Garrett .............................. | 156/290 |

Primary Examiner—William J. Van Balen
Assistant Examiner—James J. Bell

[57] ABSTRACT

A nonwoven sheet of fibrillated organic polymer material is softened by passage through the nip formed between two parallel rolls each bearing a multiplicity of square-ended pegs, the locus of the ends of all pegs on each roll lying on a cylinder whose axis coincides with the roll axis, the said rolls being engaged such that an array of pegs of one roll interpenetrates an array of pegs on the opposite roll by an amount that is at least equal to the thickness of the nonwoven sheet.

2 Claims, 3 Drawing Figures

SOFTENED FIBRILLATED SHEET

CROSS-REFERENCE TO RELATED APPLICATION

This is a continuation of application Ser. No. 442,405, filed Feb. 14, 1974, abandoned which is a divisional of Ser. No. 98,676, filed Dec. 16, 1970 now U.S. Pat. No. 3,811,979.

BACKGROUND OF THE INVENTION

This invention provides a process and apparatus for imparting textile-like softness and drape to a nonwoven sheet comprised of fibrillated organic polymer material. It also concerns the resulting product.

One variety of fibrillated polymeric material may be produced from highly oriented films or fibers by mechanical working. Mechanical working produces numerous splits and fissures in the oriented material, e.g., as disclosed in U.S. Pat. No. 3,520,458 and others to yield the highly subdivided fibrillar material. These fibrillated materials may either be prepared directly in sheet form or may subsequently be deposited to form nonwoven sheets. A second, and preferred, variety of fibrillated nonwoven sheet product may be prepared by depositing layers of flash spun plexifilamentary strand web on a moving belt, followed by cold roll consolidation as described in U.S. Pat. No. 3,169,899. Preparation of the flash spun plexifilamentary strand material is disclosed in U.S. Pat. No. 3,081,519. These preferred plexifilamentary sheets are strong, tough, opaque, and — when embossed with suitable patterns — exhibit good resistance to delamination and surface abrasion. Other routes to fibrillated polymeric material, e.g., by drawing a low density foam precursor, are also known in the art.

One process for imparting a degree of softness desirable for certain garment applications to fibrillated polymeric material is described in U.S. Pat. No. 3,427,376, as applied to point-bonded nonwoven sheets comprised of plexifilamentary strands of linear polyethylene. This process involves a combination of so-called buttonbreaking and creping operations to provide sufficient mechanical working of the sheet to loosen and mobilize the plexifilamentary material in the interior of the sheet between the point-bonded regions, thus producing a softer fabric-like material with improved drape.

SUMMARY OF THE INVENTION

The present invention provides an improved process for softening a consolidating nonwoven sheet composed of fibrillated organic polymeric material comprising passing the sheet through the nip formed between two parallel rolls, each bearing a multiplicity of square-ended pegs mounted in a fixed, spaced array covering the roll surfaces. The rolls are engaged such that the individual pegs interpenetrate the array of pegs on the opposite roll by a predetermined amount that is at least equal to the thickness (gauge) of the nonwoven sheet. A clearance that is substantially greater than the gauge of the nonwoven sheet material must be maintained at all points between adjacent pegs when the rolls are engaged and between peg ends and the opposing roll surface. As the sheet material passes through the nip of the rolls, the individual regions engaged by the peg ends are displaced from the original plane of the sheet, whereby on exiting the nip, the sheet is observed to have become substantially softer and more compliant.

The product of the present invention is a novel soft nonwoven consolidated extensible sheet material composed of fibrillated material. It may be point-bonded and typically will have on its surface a multiplicity of small, substantially continuous closed paths defined by partially fused abutting film fibril elements. Subsequent surface modification may tend to mask or obliterate the pattern of fused paths without diminishing the softness or compliance of the sheet material.

The apparatus of the invention comprises two parallel rolls whose surfaces are covered with a spaced array of a multiplicity of square-ended pegs, the spacing between said rolls being adjustable to provide a selected degree of interpenetration of the pegs of said rolls. The rolls are driven in opposite directions at substantially identical surface speeds.

DETAILED DESCRIPTION

The nonwoven sheet products suitable as starting materials for the present invention are composed of fibrillated organic material, as described above. These sheets have been consolidated as in U.S. Pat. No. 3,169,899 and have a density (independent of any resin coating or impregnant which may be present) in the range of 0.1 to 0.4 gm./cm.$^3$ and a thickness in the range of 0.07 to 0.40 mm. Optionally these sheets may be "point-bonded" to provide increased delamination resistance. By point-bonding is meant any type of discrete area bonding from resin treatment or from hot fusion, with or without the application of pressure, which bonds fibrils at points all the way through the sheet thickness. The fibers in the point-bonded sheets are firmly attached to one another within the discrete bonding areas, but can be worked loose from one another in other areas of the sheets.

Where film fibril sheets have been point-bonded by heat and fusion, the material is translucent within the bonded areas. Usually about 2 to 50% of the area is bonded. The bonded areas may be in the form of various shapes such as circles, lines, or rectangles, and they may be placed in such a way as to provide geometric designs in the sheet. The point-bonded patterns are advantageously applied by passing the sheet through one or more pair of rolls, one of each pair being a hard rubber roll and the other being an embossed roll with raised points over its entire surface. A variety of specific point-bonding procedures are well known in the art. Optionally, these sheets may also be "area-bonded" either by coating the surface with a resin or by light surface embossing to provide suitable abrasion resistance. In any case, however, the area-bonding should be mild enough so that a degree of fibril mobility is maintained in the interior of the sheet sufficient to meet the extensible criterion as defined hereinafter.

Figure 1:
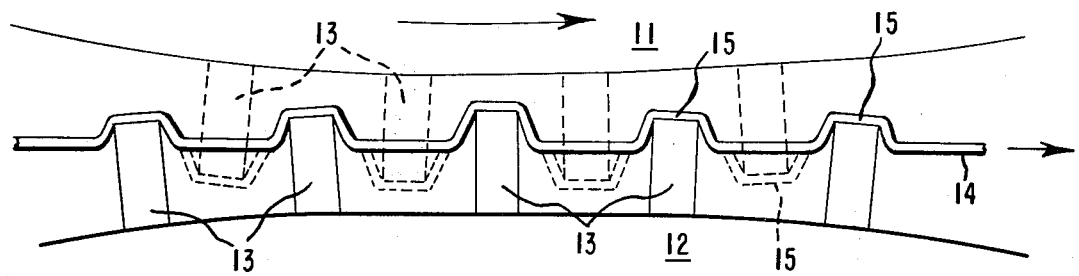
FIG. 1 is a magnified schematic representation of the sheet displacements occurring within the roll nip.

According to the present invention, such consolidated nonwoven sheets of fibrillated material are softened by passing the sheet material through the nip formed between two parallel rolls, 11 and 12 a portion of which are shown in FIG. 1, and whose surfaces are studded with numerous closely spaced small peg-like projections 13. The distance between rolls 11 and 12 is adjusted to maintain a preselected degree of interpenetration of the projections — which are arranged on the two rolls in nonabutting patterns — while still maintaining ample clearance between the tips of the pegs and the opposite roll surface. As the nonwoven sheet 14 passes through such a nip, numerous small areas 15 are displaced out of the plane of the sheet toward roll 12 by the pegs of roll 11, and toward roll 11 by the pegs of roll 12.

A critical requirement for effective softening action is that the pegs 13 be square-ended. By "square-ended" is meant that the end of each peg is substantially flat or offers a flat profile, e.g., the peg may be scooped in a concave depression and the sides of each peg make a substantial angle with the peg end to provide a relatively sharp edge at the periphery of each peg end. Ordinarily the intersection of the peg end with the peg wall will be rounded slightly to avoid excessive tearing when substantial peg interpenetration is employed. It appears that such relatively sharp edges prevent slippage of the sheet across the peg end surfaces, and provide highly concentrated stresses leading to localized drawn regions in the sheet around the circumference of each peg, as the out-of-plane displacements occur in the roll nip. Such localized "drawing" produces substantially no change in the overall length and width of the nonwoven sheet, but does provide substantial increases in the softness and drape of the nonwoven sheet.

Since the modulus of the regions surrounding the areas displaced by the peg ends appears to be quite low after the distortion, they do not rigidly support the "peg-end-areas" in their displaced positions. In fact, these areas readily reassume their original positions coplanar with the remainder of the sheet, usually as a consequence of subsequent handling operations such as light calendering, brushing, perforating, or even winding and unwinding.

Figure 2:
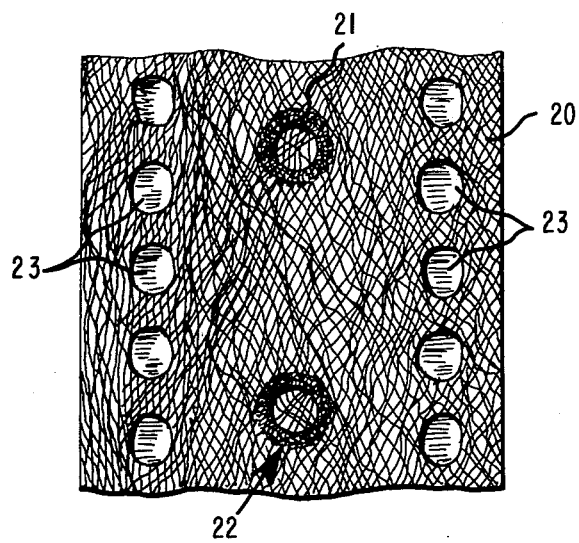
FIG. 2 is a magnified schematic view of the surface of a softened point-bonded previously consolidated nonwoven sheet.

A characteristic feature of such softened products showing film fibril elements (20) is illustrated in FIG. 2, which indicates that the highly localized "drawing" which is forced to occur around the periphery of each peg produces a distortion and apparent partial fusing of abutting individual film fibril elements (21) at the surface of the sheet in a substantially continuous closed path corresponding to the circumference of the individual pegs. By "fusing" of film fibrils is meant that these elements have been caused to stick together locally in the closed path region as evidenced by a distortion of the cross-sectional shape of the individual elements and a tendency for one film fibril to appear to "blend into" its neighboring film fibril. The identity of the individual film fibrils within the path may or may not remain discernable, depending on the severity of softening treatment and consequent degree of fusion.

Although in some cases subsequent mechanical working of the softened nonwoven sheet may be severe enough to cause such partially fused film fibrils to become "unstuck" and regain a measure of independent mobility, the undistorted cross-sectional shape of the film fibrils is not recovered. In any event, the preferred method for observing these characteristic closed paths of fused film fibrils employs conventional scanning electron microscope techniques at appropriate magnification depending on the size of the pegs employed for the softening treatment (e.g., about 20X to 100X for 30 mil diameter cylindrical pegs) and preferably with the sample tilted at an angle of from 45° to 75° with respect to the scanning beam.

The closed paths of fused film fibrils may be circular as illustrated at (22) of FIG. 2, or may take other forms such as ovals, or regular or irregular polygons, reflecting the cross-section of the pegs employed. The paths are referred to as "substantially continuous", since due to adventitious imperfections in the nonwoven sheet such as thin spots or holes, there may be an insufficient concentration of film fabrils present locally to provide an absolutely uninterrupted, continuous, path of fused abutting fibrils. Likewise, occasional misaligned or imperfectly ground pegs, or perhaps nonisotropic tensions developed locally in the sheet during passage through the nip can also lead to imperfections or interruptions in the continuity of the closed paths. There is also the possibility that "imperfections" in the form of occasional partial overlapping of the peg-softened fused paths (22) and the fused point-bonds (23) if such are present may occur. None of these types of imperfections leads to any substantial difficulty in identifying the peg-softened closed paths.

These characteristic, substantially continuous, closed paths of partially fused film fibrils (22) are readily distinguished from the point-bonded areas (23), since the degree of film fibril fusion is substantial throughout the entire area of the latter in contrast to the substantially unfused region in the interior of the peg-softening paths. A cross-section through the softened sheet which traverses a diameter of such a peg-softened region frequently reveals a ratio approaching 2:1 for the thickness of the relatively unfused central region compared to the thickness of points in the more highly fused path region. These peg-softened regions thus correspond roughly to "bubbles" of relatively unbonded film fibrils within the closed paths of relatively fused film fibrils. Furthermore, the film fibril fusion generated by the peg-softening process appears to be maximized at the surface of the sheet, while the fusion from the point bonding process ideally extends through the entire thickness of the sheet, as described above.

It is essential for operability of the present invention that the nonwoven sheet must be extensible. That is, the nonwoven sheet must possess an elongation at room temperature of at least about 10%, in order to survive intact the severe local drawing action which occurs around the perimeter of each peg in the nip. In contrast, brittle materials such as paper, or even film fibril nonwoven sheets which have been highly fused over their entire surface, become torn or perforated on passing through such a nip, and result merely in a more or less fragmented assembly of brittle pieces rather than the softened sheets of the present invention. It is postulated that this extension is a composite effect of the elongation (drawing) of individual film fibril elements plus an extension resulting from pulling apart, loosening up, and rearranging the previously relatively closely packed film fibril elements, and that this phenomenon occurs within the nonwoven sheet in a region surrounding each peg-displaced area, possibly simultaneously with the formation of the previously described, substantially continuous closed paths of partially fused film fibrils.

The preferred nonwoven sheets are composed of film fibril elements averaging less than one dpf in size, and disposed in essentially random array, although sheets with nonrandomly oriented film fibril elements can also be used. The preferred individual film fibrils possess an initial substantial level of molecular orientation and/or crystallinity.

The pegs employed in this invention may have any convenient cross-sectional shape, e.g., cylindrical. The cross-sectional area of each individual peg must be large enough to span a multiplicity, e.g., at least about 10, of the film fibril elements of the nonwoven sheet. Since the latter commonly average at least about five microns in width, the minimum operable peg cross-sectional area is approximately four square mils. Cylindrical pegs at least 10 mils in diameter are preferred. Larger pegs, of course, require larger inter-peg spacing (to permit interpenetration of pegs in the nip) with resultant fewer operating elements per unit area, and consequent diminished softening effect. Pegs up to one-third inch in diameter have been found to be operable, and a maximum useful size is estimated to be about 1 inch in diameter.

The operative surface of each roll is covered with the spaced peg array, and preferably the entire circumference and length of the rolls are so covered to provide uninterrupted softening of the nonwoven sheets. A regular, e.g., square, array of pegs is preferred to facilitate adjustment of peg interpenetration and to have equal numbers of pegs on each roll. Each peg must be square-ended with a relatively sharp edge around the circumference, and the locus of the ends of all pegs on each roll should lie on a cylinder whose axis coincides with the roll axis in order that the degree of peg interpenetration will remain constant during roll rotation. In order to distort the nonwoven sheet only in the localized peg-end-drawing softening mode, the spacing between pegs must be sufficient that even during interpenetration by pegs on the opposing roll, the clearance between pegs always remains at least equal to the gauge of the nonwoven sheet material. For pegs in square arrays, the center-to-center distance to peg diameter ratio is preferably in the range 3:1 to 5:1, although other ratios are operable. Since the pegs on each roll must contact the nonwoven sheet without motion relative thereto during passage through the nip, the peg rolls are engaged to be driven at substantially equal surface speeds, preferably from a common power source.

The depth of peg interpenetration is preferably precisely and continuously adjustable, since the degree of softening achieved is sensitive to this parameter. It is usually preferred to operate at maximum interpenetration, just short of causing perforation of the sheet by the pegs. This optimum degree of interpenetration is, of course, a function of the maximum extensibility of any given sheet, and will also be a function of the peg diameter, interpeg spacing, sheet thickness, etc.

EXAMPLE

A consolidated linear polyethylene plexifilamentary sheet of 1.15 oz./yd.$^2$ having a thickness of about 0.13 mm. and a density of about 0.31 g./cm.$^3$ and prepared by the process of U.S. Pat. No. 3,169,899, which is subsequently embossed on one side with rows of point-bonds ("rib" pattern) and surface-embossed on the opposite side with a "linen" pattern (as in Examples VI and VII of U.S. Pat. No. 3,427,376) is substantially softened on being passed through the nip of two rolls each studded with square-ended cylindrical pegs 0.030 inch in diameter spaced in a square array on one-eighth inch centers and set to a 0.060 inch depth of face-centered interpenetration. The resultant product had peg-softened closed paths surrounding substantially unfused regions in the interior of the paths. A second pass through a similar nip produced a further increase in softness to a level suitable for garment applications.

Figure 3:
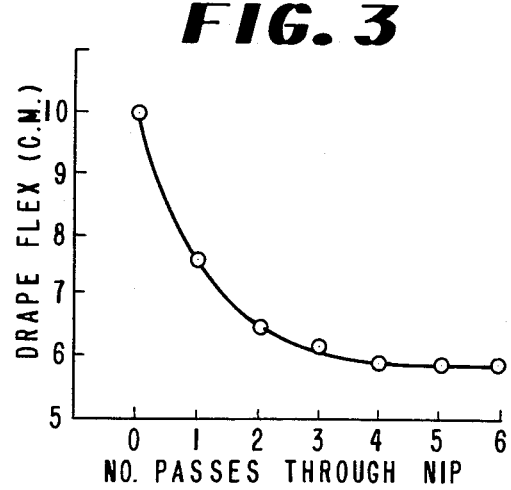
FIG. 3 indicates the improvement in softness achieved with one or more passes of a point-bonded previously consolidated nonwoven sheet of fibrillated material through the softening nip.

The degree of softening achieved as a function of the number of passes through the softening nip is illustrated by the data of FIG. 3. Here Drape Flex (ASTM Test D 1388-64, option A) is employed as a measure of sheet softness. (Lower values correspond to softer products.) When increased porosity is also desired, such sheets may be perforated, as by needle punching.

What is claimed is:

1. A softened nonwoven sheet of fibrillated organic polymeric material, said sheet having a surface pattern of spaced substantially continuous closed paths of fused abutting individual film fibril elements surrounding substantially unfused regions in the interior of the paths.

2. The product of claim 1 wherein the sheet additionally contains point-bonded areas.

* * * * *